United States Patent [19]
Feng et al.

[11] Patent Number: 6,034,179
[45] Date of Patent: Mar. 7, 2000

[54] POLYOLEFIN COMPOSITIONS CONTAINING ORGANOSILICON COMPOUNDS AS ADHESION ADDITIVES

[75] Inventors: Qian Jane Feng; Kenneth Michael Lee, both of Midland; Michael Andrew Lutz, Hope; Michael James Owen, Midland; Susan Victoria Perz, Essexville; Toshio Suzuki, Midland, all of Mich.

[73] Assignee: Dow Corning Corporations, Midland, Mich.

[21] Appl. No.: 09/143,410

[22] Filed: Aug. 28, 1998

[51] Int. Cl.⁷ ..................................................... C08F 8/00
[52] U.S. Cl. .......................................... 525/106; 525/100
[58] Field of Search ..................... 525/106, 100

[56] References Cited

U.S. PATENT DOCUMENTS

| | | | |
|---|---|---|---|
| 2,349,338 | 5/1944 | Clapsadle | 252/75 |
| 2,630,446 | 3/1953 | Gresham | 260/448.8 |
| 2,776,307 | 1/1957 | Abbott | 260/448.8 |
| 3,029,269 | 4/1962 | Abbott | 260/448.8 |
| 3,445,420 | 5/1969 | Kookootsedes | 260/37 |
| 3,644,315 | 2/1972 | Gardner | 260/85.3 |
| 3,989,667 | 11/1976 | Lee | 260/45.5 |
| 4,518,726 | 5/1985 | Kato | 524/32 |
| 4,659,851 | 4/1987 | Plueddemann | 556/431 |
| 4,719,262 | 1/1988 | Plueddemann | 525/105 |
| 4,906,686 | 3/1990 | Suzuki | 524/730 |
| 4,975,488 | 12/1990 | Furukawa | 525/100 |
| 4,981,728 | 1/1991 | Homma | 427/386 |
| 5,002,808 | 3/1991 | Hahn | 427/387 |
| 5,233,006 | 8/1993 | Wolter | 528/32 |
| 5,397,648 | 3/1995 | Babu | 428/523 |
| 5,424,384 | 6/1995 | Gentle et al. | 528/12 |
| 5,486,565 | 1/1996 | Gentle et al. | 524/750 |
| 5,532,298 | 7/1996 | Monroe | 524/13 |
| 5,595,826 | 1/1997 | Gray | 428/450 |
| 5,683,527 | 11/1997 | Angell | 156/78 |
| 5,928,794 | 7/1999 | Kalinowski et al. | 428/447 |

FOREIGN PATENT DOCUMENTS

| | | |
|---|---|---|
| 286218 | 10/1988 | European Pat. Off. ........ C08C 19/00 |
| 1009204 | 7/1987 | Japan . |
| 3-188166 | 8/1991 | Japan . |
| 5271556 | 3/1992 | Japan . |
| 06116368 | 4/1994 | Japan . |
| 6-279691 | 10/1994 | Japan . |
| 9-316293 | 5/1996 | Japan . |
| 97316293 | 12/1997 | Japan . |
| 450875 | 8/1936 | United Kingdom . |
| WO9621633 | 7/1996 | WIPO . |

*Primary Examiner*—Margaret G. Moore
*Attorney, Agent, or Firm*—Alex Weitz

[57] ABSTRACT

The present invention provides adhesion promoters for curable polyolefin compositions wherein said adhesion promoters are selected from a specified group of hydrocarbyloxy-substituted organosilicon compounds and condensation products of these compounds. At least one hydrocarbyloxy group on each silicon atom of the adhesion promoter is derived from a polyhydric alcohol containing at least two hydroxyl groups per molecule and substantially no ethylenic unsaturation.

20 Claims, No Drawings

POLYOLEFIN COMPOSITIONS CONTAINING ORGANOSILICON COMPOUNDS AS ADHESION ADDITIVES

FIELD OF THE INVENTION

This invention relates to polyolefin compositions that contain a specified class of organosilicon compounds to achieve strong bonding to a variety of substrates, particularly glass and metals. The polyolefin contains functional groups that are subsequently reacted to crosslink the polymer.

BACKGROUND OF THE INVENTION

The properties of polyolefins are desirable for a variety of end use applications, particularly in construction, packaging, automotive and consumer markets. Compositions containing these polymers are useful as pressure sensitive adhesives for paper labels, for sealing tires and as adhesives for assembly of single ply roofing. Recently there is a trend toward the use of curable polyolefin compositions. One benefit of these curable compositions is the ability to prepare flowable solventless compositions which following application and curing exhibit properties similar to those of solvent-based adhesives.

A shortcoming of polyolefin compositions, particularly those that cure by a platinum group metal catalyzed hydrosilation reaction, is their inability to develop strong adhesion to a variety of substrates, particularly glass and certain metals, following curing under commercially feasible conditions of time and temperature. One method for remedying this deficiency is by using primer compositions or adhesion promoting additives containing one or more silanes and/or organopolysiloxanes with a plurality of silicon-bonded hydrolyzable groups and at least one organofunctional substituent that is bonded to silicon through at least one carbon atom. Primer compositions are applied to substrates to which adhesion is desired prior to application of a curable composition. Adhesion promoters are present as additional ingredients in curable composition.

U.S. Pat. No. 5,397,648 to Babu et al. describes pressure sensitive compositions for automotive masking tape. The compositions include a moisture curable alpha olefin copolymer containing hydrolyzable or condensable silyl groups.

U.S. Pat. No. 5,002,808 to Hahn and Kreil teaches blending a monomeric or oligomeric precursor of a polyolefin with a silane adhesion aid containing a benzocyclobutane group as a substituent. The monomer or oligomer preferably contains these groups.

U.S. Pat. No. 4,981,728 to Honua et al. describes a method for bonding curable organic polymer compositions to a surface using a primer. The curable composition contains 1) an organic polymer with SiX units where X is OH or a hydrolyzable group, 2) an epoxy resin, 3) a curing agent for the epoxy resin and 4) a curing agent for the organic polymer. The primer is a vinyl polymer containing Si bonded to OH or a hydrolyzable group and is a reaction product of a) a vinyl-containing polymer, preferably a poly(meth)acrylate, and b) a silane or siloxane containing hydrogen and hydrolyzable groups bonded to silicon.

U.S. Pat. Nos. 3,424,376 and 3,644,315 describe sealants for glass containing a hydrocarbon-based polymer with at least one silicon atom bonded to OH or a hydrolyzable group.

U.S. Pat. No. 4,975,488 to Ando et al. describes compositions containing 1) a vinyl polymer wherein at least one silicon atom is bonded to a hydrolyzable group and 2) a silane or disilane containing at least one OH or a hydrolyzable group.

Japanese Laid Open Application No. 01-9204 teaches reacting organic polymers containing at least one double bond or other SiH-reactive group with an organohydrogensilane or organohydrogensiloxane.

European Patent 286,218 assigned to Imperial Chemical Industries describes adhesion promoters that are organic polymers containing acid groups or precursors of acid groups and a condensable silicon-containing group.

U.S. Pat. No. 4,518,726 to Kato et al. describes metal-containing paint compositions containing a vinyl polymer with at least one silicon-bonded hydrolyzable group. A silane containing coupling agent is preferably present to retain metal powder in suspension.

Adhesion promoting additives described in the prior art typically contain at least two functional groups.

U.S. Pat. No. 5,233,006, U.S. Pat. Nos. 5,339,738, and 5,532,298 to Egger et al. describe novel polymerizable silanes containing hydrolyzable groups and acrylate or methacrylate groups. The compounds are prepared by reacting a silane containing hydrolyzable groups and an isocyanate group with a hydroxyl- or amino-substituted compound containing at least one C=C group.

U.S. Pat. Nos. 4,659,851, 4,719,262, and 4,906,686 teach reaction products of unsaturated alcohols with alkoxysilanes as adhesion promoting additives.

Reaction products of alkyl orthosilicates with saturated polyhydric alcohols are described in the prior art.

U.S. Pat. No. 2,349,338 discloses using hydrolysis products of silicic acid esters of monohydric and polyhydric alcohols, including various glycol and glycerol silicate ester derivatives as corrosion prevention additives for heat transfer liquids.

U.S. Pat. No. 2,776,307 claims organosilicon esters of the general formula $(R^1O)_3Si(XR^2)_nOSi(OR^3)_3$, where $R^1$ and $R^3$ are saturated aliphatic hydrocarbon radicals containing from 1 to 16 carbon atoms, $R^2$ is ethylene or propylene, X can be oxygen, and n has a value of 2,3, or 4. The compounds are used as hydraulic fluids and lubricants.

U.S. Pat. No. 2,630,446 teaches using polymeric silicates prepared from tetraalkylsilicates and polyhydric alcohols as plasticizers, lubricants, and hydraulic fluid additives.

H. G. Emblem and K. Hargreaves in an article entitled "The Preparation of Alkoxysilanes from Glycols and Glycol Monoethers", J. Inorg. Nucl. Chem., Vol.30 (3), p. 721, 1968 report various reactions useful to prepare these compounds. U.K. Patent No. 450,875 teaches a transesterification process for the manufacture of new esters of orthosilicic acid. Among the esters disclosed are those derived from polyhydric alcohols.

U.S. Pat. No. 3,029,269 teaches compounds of the general formula $(RO)_3SiOCR'_2(CH_2)_nCR'_2\text{-}OSi(OR)_3$, where n is 0–16, R' is H or a lower aliphatic radical, and R is a saturated aliphatic radical containing from 1 to 16 carbons. Suggested uses for the compounds are hydraulic fluids and other applications requiring low pour point, good viscosity and viscosity index properties, and hydrolytic stability.

U.S. Pat. No. 5,424,384, issued to Gentle and Lutz on Jun. 13, 1995 teaches curable organopolysiloxane compositions containing adhesion promoters that are reaction products of 1) a polyol that is free of ethylenic unsaturation and 2) a silane or bis-silylalkane containing at least three alkoxy groups bonded to each silicon atom. There is no teaching in the patent suggesting the utility of the disclosed adhesion promoters as adhesion promoters for polyolefins.

Japanese Patent Publication (Kokai) No. 09-316293, published on Dec. 9, 1997 describes saturated hydrocarbon polymers curable by a hydrosilation reaction. The polymers contain a silane coupling agent to improve their adhesion. Glycidoxypropyltrimethoxysilane is one of the adhesion promoters disclosed. This publication does not describe or suggest adhesion promoters that are alkoxysilanes wherein the alkoxy groups are derived from polyhydric alcohols.

SUMMARY OF THE INVENTION

An objective of this invention is to define a group of organosilicon compounds, that when present in curable polyolefin compositions, result in strong cohesive bonding between the cured compositions and a variety of substrates during curing of the compositions.

This objective can be achieved by the presence in the curable polyolefin composition of a specified group of hydrocarbyloxy-substituted organosilicon compounds and condensation products of these compounds. At least one hydrocarbyloxy group on each silicon atom is derived from an alcohol containing at least two hydroxyl groups per molecule.

DETAILED DESCRIPTION OF THE INVENTION

This invention provides a polyolefin composition exhibiting adhesion to various inorganic and selected organic substrates, said composition comprising A. at least one polyolefin comprising (1) repeating units derived from at least one olefin and (2) functional groups capable of reacting to crosslink said polyolefin; and B. an adhesion promoter for said polyolefin; wherein said adhesion promoter is at least one member selected from the group consisting of hydrocarbyloxy-substituted organosilicon compounds and condensation products thereof wherein at least one hydrocarbyloxy group on each silicon atom is a residue of a polyhydric alcohol that is substantially free of ethylenic unsaturation.

The present adhesion promoters are preferably reaction products of ingredients comprising (B1) a polyhydric alcohol of the general formula $R^1(OH)_m$ and (B2) at least one organosilicon compound selected from the group consisting of silanes of the general formula $R^2{}_n SiX_{(4-n)}$ and bis-silylalkanes of the formula $X_3SiR^3SiX_3$, wherein said reaction products contain at least two silicon atoms per molecule; $R^1$ represents a hydrocarbon radical or an alkoxy-substituted hydrocarbon radical, wherein $R^1$ is substantially free of ethylenic unsaturation and exhibits a valence of m; m represents an integer with a value of at least 2; $R^2$ is selected from the group consisting of unsubstituted hydrocarbon radicals and hydrocarbon radicals containing at least one substituent selected from the group consisting of $CH_2$=CH—, acryloxy, methacryloxy, epoxy, carboxy, amino, amido, acrylamido, methacrylamido,

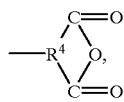

and mercapto; $R^3$ is alkylene; $R^4$ is a trivalent hydrocarbon radical; X represents a hydrolyzable group and n is 0 or 1; and wherein said organosilicon compound constitutes from 10 to 90 percent, preferably from 30 to 70 percent, of the combined weight of said compound and said polyhydric alcohol.

As used in this specification the term "cure" means the conversion of a liquid or semi-solid composition to a crosslinked gel, elastomer or resinous material by the reaction of groups present on the polyolefin referred to as ingredient A of the present compositions with a curing agent.

The adhesion promoting additives can be used with polyolefin compositions that can be cured using any of the reactions described in the prior art for these type of compositions.

The reactions that can be used to cure the polyolefin ingredient of the present compositions include but are not limited to 1) the platinum-catalyzed reactions of silicon-bonded hydrogen atoms with alkenyl radicals or silanol groups present on the polyolefin;
2) the reaction of silicon-bonded hydrolyzable groups on the polymer in the presence of atmospheric moisture;
3) the reaction of silicon-bonded hydrolyzable groups with silanol groups in the presence of a suitable catalyst;
4) the reaction of mercapto groups with one another in the presence of oxygen and a suitable catalyst, typically a chelated organometallic compound such as cobaltocene;
5) the reaction of epoxy groups with acid anhydride or amine groups in the presence of a suitable catalyst;
6) the reaction of mercapto groups with alkenyl radicals in the presence of a catalyst that is typically a metal carboxylate of a chelated organometallic compound such as ferrocene;
7) reactions involving groups present on the polyolefin with either free radicals or cations formed by irradiation of photosensitive compounds with ultraviolet light; and
8) reactions involving groups present on the polyolefin that are initiated by high energy particles such as those present in electron beams.

Preferred curing reactions include: 1) the reaction of alkenyl groups such as allyl present on the polyolefin with an organohydrogensiloxane using platinum or a platinum compound as the catalyst; 2) the reaction of silanol groups on a polyolefin with silicon-bonded hydrogen atoms on the curing agent in the presence of the same catalysts used for hydrosilation reactions, tin compounds or amines, particularly hydroxylamines; and 3) free radical reactions involving polymerization of ethylenically unsaturated groups such as acryloxy, methacryloxy, acrylamide and methacrylamide present on the polyolefin, wherein the free radicals are generated by irradiation of a photosensitive compound such as alpha-hydroxy ketones.

The present adhesion promoters are particularly effective when used in polyolefin compositions that are cured at temperatures of from 25 to 125° C.

The Adhesion-Promoting Additive (Ingredient B)

The characterizing feature of the present polyolefin compositions is the presence as an adhesion promoting additive of at least one member selected from the group consisting of hydrocarbyloxy-substituted organosilicon compounds and condensation products thereof wherein each silicon atom of said compounds and condensation products contains at least one hydrocarbyloxy group that is a residue resulting from removal of a hydrogen atom from one of the hydroxyl groups of a polyhydric alcohol that is substantially free of ethylenic unsaturation.

The adhesion promoters are preferably reaction products of ingredients comprising (B1) a polyhydric alcohol that is substantially free of ethylenic unsaturation and (B2) at least one organosilicon compound selected from silanes and bis-silylalkanes containing at least three silicon-bonded hydrolyzable groups. These reaction products are described as adhesion promoters for curable organosiloxane compositions in U.S. Pat. No. 5,424,384, which issued to Gentle and Lutz on June 13, 1995 and is assigned to the same assignee as the present application.

The Organosilicon Compounds

The organosilicon compounds, referred to hereinafter as ingredient B2, constitute from 10 to 90 percent, preferably from 30 to 90 percent, of the combined weight of ingredient B2 and the aforementioned polyhydric alcohol, which will be referred to hereinafter as ingredient B1. The silanes are represented by the general formula $R^2_n SiX_{(4-n)}$ and the bis-silylalkanes by the formula $X_3 SiR^3 SiX_3$. In these formulae $R^2$, $R^3$, X and n are as previously defined.

The monovalent hydrocarbon radical represented by $R^2$ preferably contains from 1 to about 10 carbon atoms, and is most preferably alkyl containing from 1 to 4 carbon atoms.

When $R^2$ represents a substituted hydrocarbon radical, the substituent is an organofunctional group selected from the group consisting of $CH_2$=CH—, acryloxy, methacryloxy, epoxy, carboxy, amino, amido, acrylamido, methacrylamido,

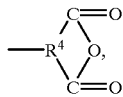

and mercapto where $R^4$ represents a trivalent hydrocarbon radical as previously defined. $R^4$ preferably contains from 1 to about 4 carbon atoms.

The hydrolyzable groups of ingredient B2, represented by X, are preferably alkoxy containing from 1 to about 20 carbon atoms or an isoalkenyloxy group containing from 3 to 8 carbon atoms.

The preferred alkoxy or isoalkenyloxy groups represented by X can be replaced by other hydrolyzable groups such as ketoximo or amino so long as these alternative groups do not interfere with curing or storage of the present organopolysiloxane compositions.

When X represents an alkoxy group, it contains from 1 to about 20 carbon atoms, preferably from 1 to 4 carbon atoms, and is most preferably methoxy or ethoxy.

When X is an isoalkenyloxy group it is represented by the formula —OCR=CR'R'", where R represents an alkyl radical, and R' and R" are individually selected from hydrogen atoms and alkyl radicals containing from 1 to 4 or more carbon atoms, with the proviso that the isoalkenyloxy group contains from 3 to 8 carbon atoms. R and R' can be joined to form a cycloalkenyl radical. Preferably R is methyl, R' and R" are hydrogen and the isoalkenyloxy group is isopropenyloxy.

Preferred silanes include, but are not limited to, methyltrimethoxysilane, methyltriethoxysilane, allyltrimethoxysilane, tetramethyl orthosilicate, tetraethyl orthosilicate and methyltriisopropenyloxysilane.

When ingredient B2 is a bis-silylalkane, $R^3$ is preferably methylene, ethylene, propylene or hexamethylene.

When more than one organosilicon compound is present as ingredient B2, one of these ingredients is preferably a tetraalkoxysilane such as tetraethoxysilane, also referred to as tetraethyl orthosilicate, and the second is preferably a silane of the general formula $R^2 Si(OR^5)_3$ wherein $R^5$ is an alkyl radical and $R^2$ contains an organofunctional group as a substituent. $R^5$ preferably contains from 1 to 4 carbon atoms.

The Polyhydric Alcohol (Ingredient B1)

The hydrocarbon or alkoxy substituted hydrocarbon radical of the polyhydric alcohol, represented by $R^1$ in the formula $R^1$(OH)m for this ingredient, can be linear, cyclic or branched. This hydrocarbon radical is preferably linear or branched and contains from 2 to 20, most preferably from 2 to 10 carbon atoms, and m is preferably from 2 to 4, inclusive.

Preferred polyhydric alcohols include, but are not limited to, ethylene glycol, propylene glycol, 1,3-propanediol, glycerol, 1,4-butanediol, neopentyl glycol, 2,2,2-trimethylol propane, 2,2,2,2-tetramethylolpropane and 1,10-decanediol.

One preferred embodiment of ingredient B is an organosilicon compound represented by the formula $$R^1(OSiR^2_n X_{3-n})_m, \qquad 1)$$

wherein $R^1$, $R^2$, X and m are as previously defined and n is 0 or 1.

The embodiment represented by formula 1 contains m moles of a residue derived from ingredient B2 per molecule of polyhydric alcohol, and each silicon atom is bonded to only one residue of the polyhydric alcohol.

It should be apparent that formula 1 does not represent the only embodiment of ingredient B. Each of the alcohol and the silane contain at least two groups capable of reacting with the other ingredient of the adhesion promoter. Depending upon the functionality of each of these ingredients and their relative concentrations, linear or crosslinked oligomers can be formed. For this reason, ingredient B is typically a mixture of monomeric and oligomeric compounds. One of these species will usually predominate.

The predominating species present in ingredient B is dependent upon a number of variables, including but not limited to the number of carbon atoms and hydroxyl groups present in ingredient B1, the relative amounts of ingredients B1 and B2, and the conditions under which these ingredients are reacted.

Preferred embodiments of ingredient B are flowable at 25 to 35° C.

Optional Adhesion Promoter Ingredients

The reaction mixture used to prepare the present adhesion promoting compositions can include a number of optional ingredients that have been shown to improve the performance of the present adhesion promoters under various conditions that may be encountered during use of cured polyolefin compositions.

One of these optional ingredients, referred to hereinafter as ingredient B3, is a mono- or polyhydric alcohol of the formula $R^6(OH)_p$ where $R^6$ represents a hydrocarbon radical exhibiting a valence of p and containing at least one organofunctional substituent selected from the group consisting of $CH_2$=CH—, acryloxy, methacryloxy, epoxy, carboxy, amino, amido, acrylamido, methacrylamido,

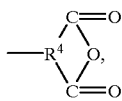

where $R^4$ is as previously defined, and mercapto and p is an integer with a value of at least 1, preferably 1, 2, or 3.

The preferred molar ratio of ingredient B1 : ingredient B3 is from 1:2 to 2:1. This ratio is preferably 1 mole of ingredient B1 per mole of B3. Particularly preferred embodiments contain 1 mole of ingredient B1 and 1 mole of ingredient B3 per 1.4 moles of ingredient B2.

A second optional ingredient, referred to as B4, that can be included in the reaction mixture for preparing ingredient B is an organosilane of the formula $R^7_q R^8_r SiY_{4-q-r}$ or an organopolysiloxane exhibiting the average unit formula $R^7_q R^8_r Y_s SiO_{(4-q-r-s)/2}$.

In the formulae for ingredient B4, $R^7$ represents an unsubstituted monovalent hydrocarbon radical; $R^8$ represents a monovalent hydrocarbon radical containing an organofunctional substituent selected from the group consisting of $CH_2=CH-$, acryloxy, methacryloxy, epoxy, carboxy, amino, amido, acrylamido, methacrylamido, and mercapto; Y represents a hydroxyl group or a group that is hydrolyzed to a hydroxyl group in the presence of water; the average value of q is from 0 to 3, inclusive; the average values of r and s are greater than 0 and no greater than 3, and the sums of q and r in the organosilane and q, r and s in the organopolysiloxane do not exceed 3.

The unsubstituted monovalent hydrocarbon radical represented by $R^7$ and the hydrocarbon portion of $R^8$ contain from 1 to 20 or more carbon atoms. The $R^7$ hydrocarbon radicals are substantially free of ethylenic unsaturation and are selected from alkyl radicals such as methyl, ethyl and propyl; cycloalkyl radicals such as cyclohexyl and aromatic hydrocarbon radicals such as phenyl, tolyl and benzyl. $R^7$ is preferably alkyl containing from 1 to 5 carbon atoms, and is most preferably methyl or ethyl. The hydrocarbon radical represented by $R^8$ contains at least one of the aforementioned organofunctional substituents. The hydrocarbon portion of $R^8$ can be alkylene such as methylene or ethylene, cycloalkylene such as cyclohexylene or aryl such as phenylene or tolylene.

When used, ingredient B4 preferably constitutes from 40 to 70 weight percent of the organosilicon compounds used to prepare ingredient B.

To ensure maintenance of adhesion of cured polyolefin compositions in the presence of water or a high humidity environment, a second adhesion promoting additive can be included in the curable composition, referred to hereinafter as B5. Ingredient B5 is an organosilicon compound selected from the group consisting of organosilanes and organopolysiloxanes containing (a) at least one of a first reactive group selected from silanol and hydrolyzable groups such as alkoxy or isoalkenyloxy that will not interfere with curing of the polyolefin composition; and (b) at least one of a second reactive group capable of participating in the curing reaction. In preferred polyolefin compositions that will be cured by a hydrosilation reaction, the second reactive group (b) contains an ethylenically unsaturated hydrocarbon radical or a silicon-bonded hydrogen atom.

Preferred unsaturated groups of ingredient B5 are vinyl, allyl, 5-hexenyl, 10-undecenyl and other hydrocarbon radicals or organofunctional substituents containing a carbon-to-carbon double bond at a terminal position.

When the present polyolefin compositions are cured by a hydrosilation reaction, the silane embodiment of ingredient B5 exhibits the formula $R^9_t R^{10}_u Si(OZ)_{4-t-u}$ and at least a portion of the repeating units in preferred organopolysiloxanes useful as ingredient B5 exhibit the formulae $R^9_t R^{10}_u SiO_{(4-t-u)/2}$ and $(OZ)_v R^{10}_u SiO_{(4-u-v)/2}$. In these formulae, $R^9$ represents hydrogen or an ethylenically unsaturated group capable of undergoing a hydrosilation reaction; $R^{10}$ represents an unsubstituted or substituted alkyl radical containing from 1 to 4 carbon atoms; t and v are 1, 2 or 3; u is 0, 1, 2 or 3; the sum of t+u and u+v do not exceed 3; OZ is selected from the group consisting of hydroxyl, alkoxy containing from 1 to 4 carbon atoms and isoalkenyloxy, with the proviso that v is 1 when Z is H. $R^{10}$ is preferably alkyl containing from 1 to 4 carbon atoms.

In addition to silanol and/or hydrolyzable groups and substituents capable of participating in the reaction used to cure the polyolefin, ingredient B5 can also contain adhesion promoting reactive groups such as epoxide groups, that are bonded through carbon to the silicon atom of this ingredient, provided that these adhesion promoting groups do not interfere with curing or storage stability of the present silicone compositions. Useful adhesion promoting groups include, but are not limited to, $-CH_2=CH_2$, acryloxy, methacryloxy, epoxy, carboxy, amino, amido, acrylamido, methacrylamido, and mercapto.

Preferred adhesion promoting groups that can be present in ingredient B5 include 3-glycidoxypropyl and 4-epoxy-cyclohexylethyl.

When included in the curable composition, ingredient B5 constitutes from 10 to 90 weight percent, preferably from 20 to 50 weight percent, based on the total weight of the adhesion promoters for the polyolefin. Preparation of Ingredient B The reaction between the required and optional organosilicon compound(s) (ingredients B2 and B4) and the required and optional mono- and polyhydric alcohol(s) (ingredients $B_1$ and B3) is conducted under conditions that are typical for interchange reactions between these classes of compounds. These reactions are typically conducted under an inert, anhydrous atmosphere such as nitrogen at temperatures from ambient to 200° C. and may employ a catalyst. Suitable catalysts include, but are not limited to, acids, bases and organotitanium compounds. Sulfonic acids such as trifluoromethanesulfonic acid, are preferred catalysts.

The weight of catalyst typically constitutes from about 0.1 to about 5 percent of the combined weight of all reactants.

When it is desired to prepare compounds corresponding to the foregoing formula 1, the reaction mixture contains at least m moles of ingredient B2 per mole of ingredient B1.

When ingredient B2 is an alkoxysilane, this ingredient can be prepared and isolated prior to reacting it with the polyhydric alcohol or ingredient B2 can be prepared by reacting the corresponding chlorosilane with the desired monohydric alcohol in the same reactor in which it is subsequently reacted with ingredient B1.

Reactions involving exchanges of silicon bonded alk-oxy and isoalkenyloxy groups generate the alcohol or ketone corresponding to the original silicon-bonded alkoxy or isoalkenyloxy group as a by-product. Because these reactions are often reversible, it is usually desirable to remove this by-product alcohol or ketone by distillation as the reaction progresses.

The course of exchange reactions involving the generation and removal of alcohol and/or ketone by-products can readily be followed by measuring the amount of by-product collected.

Methanol and ethanol are the lowest boiling alcohols, and are most easily removed during preparation of the present adhesion-promoting additives. It is therefore preferable that the alkoxy groups of the present adhesion additives, represented by $OR^4$ in the foregoing formulae, be methoxy or ethoxy. For the same reason, the isoalkenyloxy group is preferably isopropenyloxy.

The reactants and catalyst are heated for a period of time sufficient to achieve a substantially complete reaction, as indicated by the amount of by-product alcohol or ketone collected. This time period is typically from 1 to about 5 hours and the reaction mixture is preferably heated from about 50 to 120° C.

It may be desirable to include in the reaction mixture a liquid diluent that may also function as a solvent for the reactants. Suitable diluents include aliphatic and aromatic hydrocarbons that are liquid at ambient temperature and boil within the range of from 50 to about 200° C. Representative diluents include alcohols such as methanol, ethanol, and iso-propanol, aliphatic hydrocarbons such as hexane and heptane, and liquid aromatic hydrocarbons such as toluene and xylene.

Use of the Present Adhesion-Promoting Additives

The present adhesion promoting additives are particularly useful in polyolefin compositions that cure by a platinum group metal-catalyzed hydrosilation reaction at temperatures below about 150° C. The additives are also useful in polyolefin compositions that cure under ambient conditions in the presence of moisture by a condensation reaction between silanol and silicon-bonded alkoxy or other silicon-bonded hydrolyzable groups, or by any of the reactions described in the art for curing polyolefin compositions. Curable polyolefin compositions are described in numerous patents and technical publications, some of which are discussed in a preceding section of this specification.

The concentration of adhesion promoting additive, ingredient B, is sufficient to provide cohesive bonding of the cured composition to the desired substrate. This typically requires at least about 1 weight percent by weight of the adhesion promoter, based on the weight of the curable composition. A concentration of between 2 and 6 weight percent is preferred.

The ability of the polyolefin composition to cure completely under the desired conditions and/or the properties of the cured composition can be adversely affected when the concentration of adhesion promoting additive exceeds about 10 weight percent, based on the weight of the curable composition.

For purposes of the present invention, cohesive bonding is characterized by cohesive failure, which occurs when the strength of the bond between the cured polyolefin and the substrate exceeds the tensile strength of the cured material. In a typical adhesion test, increasing force is applied to the layer of cured material until at least a portion of the material is removed from the substrate.

Cohesive failure occurs within the body of the cured polyolefin material rather than at the interface between the material and the substrate that the material is in contact with during the curing reaction. At least a portion of the cured material remains adhered to the substrate.

The ingredients of preferred curable polyolefin compositions suitable for use with the present adhesion promoting additives will now be discussed in detail.

The Polyolefin (Ingredient A)

The polyolefin, referred to hereinafter as ingredient A, of preferred curable compositions of this invention is the principal ingredient of these compositions. The molecules of the polyolefin comprise (a) repeating units derived from at least one olefin containing from 2 to about 10 carbon atoms; and (b) at least two functional groups per molecule that react during curing of the polyolefin to form a crosslinked material. The repeating units of the polyolefin preferably contain from 2 to 5 carbon atoms. Most preferably at least 90 percent of the repeating units are butylene or isobutylene.

The molecular structure of the polyolefin is not critical to the present invention, and will be determined by the physical properties desired in the cured composition. To achieve a useful level of tensile properties in the elastomers and other products prepared by curing the present compositions, the molecular weight of this ingredient should be sufficient to achieve a viscosity at 25° C. greater than about 0.1 Pas.

The upper limit for the molecular weight of the polyolefin is not specifically restricted, and is typically limited only by the processability of the curable composition.

The viscosity of the polyolefin can range from a pourable liquid to a gum type polymer that is typically characterized by Williams plasticity values.

Preferred embodiments of ingredient A are isobutylene polymers or copolymers represented by the following general formulae I, II or III.

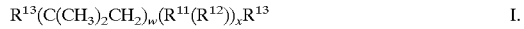
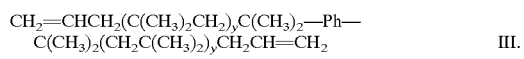

In these formulae $R^{11}$, represents a trivalent hydrocarbon radical, $R^{12}$ and $R^{13}$ are monovalent hydrocarbon radicals containing the $CH=CH_2$ group and $R^{14}$ represents a divalent olefinically unsaturated hydrocarbon radical. The degrees of polymerization represented by y and the sum of w and x are sufficient to impart a viscosity of at least 100 centipoise (0.1 Pa.s), preferably from 0.1 to 1000 Pa.s, measured at 25° C.

The present compositions can cure to form crosslinked products by a variety of reactions described in the prior art. Preferred reactions include but are not limited to the reaction of groups present on the polyolefin with activating agents such as water and high energy electron beams, the reaction of groups present on the polyolefin with free radical sources such as organic peroxides and compounds yielding free radicals in the presence of ultraviolet radiation, the reaction of groups present on the polyolefin with groups present on a curing agent that is added when it is desired to cure the polyolefin. The reaction between the polyolefin and curing agent may also require the presence of a catalyst, such as the platinum catalyst required for the reaction of silicon-bonded hydrogen atoms with ethylenically unsaturated functional groups.

A preferred reaction for curing the polyolefin is hydrosilation, the reaction between ethylenically unsaturated groups and silicon-bonded hydrogen atoms.

The polyolefin preferably contains at least two silicon-bonded alkenyl radicals in each molecule. Suitable alkenyl radicals contain from 2 to about 10 carbon atoms and are exemplified by but not limited to vinyl, allyl and 5-hexenyl.

Preferred Polyolefin Curing Agents

The polyolefin, ingredient A of the present compositions, preferably contains at least two ethylenically unsaturated hydrocarbon radicals and is cured by reacting the composition with at least one organohydrogenpolysiloxane containing at least two silicon-bonded hydrogen atoms per molecule. This reaction is known as hydrosilation and is conducted in the presence of a hydrosilation catalyst. Hydrosilation catalysts are typically platinum group metals and compounds of these metals.

Preferably, when more than one organohydrogenpolysiloxane is used, one of these is a copolymer consisting essentially of methylhydrogensiloxane and dimethylsiloxane units and the second is a copolymer consisting essentially of methylhydrogensiloxane units and two types of diorganosiloxane units. One type of diorganosiloxane unit is dimethylsiloxane and the second type is of the general formula $(CH_3)(C_zH_{2z+1})SiO$ where the value of z is from 10 to 20. Most preferably the total number of diorganosiloxane units is approximately equal to the number of methylhydrogensiloxane units in the copolymer. The term "approximately equal" implies a numerical difference of not more than +10 units.

If the polyolefin contains only two alkenyl radicals per molecule, the curing agent must contain an average of more than two silicon-bonded hydrogen atoms to achieve a crosslinked structure in the final cured product.

The organic groups in the organohydrogenpolysiloxane are preferably substantially free of ethylenic or acetylenic unsaturation. The molecular structure of the organohydrogenpoly-siloxane can be straight chain, branch-containing straight chain, cyclic, or network.

While the molecular weight of the preferred type of organohydrogenpolysiloxane is not specifically restricted, viscosities in the range of3 to 10,000 centipoise (0.003 to 10 Pa.s) at 25° C. are preferred.

The concentration of organohydrogenpolysiloxane is sufficient to provide a molar ratio of silicon-bonded hydrogen atoms to alkenyl radicals in the curable composition of from 0.4 to 20. A range of from 0.4 to 4 is preferred.

When the curable composition contains less than 0.4 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The Platinum-Containing Hydrosilation Reaction Catalyst

The reaction between organohydrogenpolysiloxanes and ethylenically unsaturated groups is catalyzed by metals from the platinum group of the periodic table and compounds of these metals. The metals include platinum, palladium and rhodium. Platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organopolysiloxanes containing ethylenically unsaturated hydrocarbon radicals bonded to silicon. Complexes of chioroplatinic acid with the aforementioned organopolysiloxanes containing ethylenically unsaturated hydrocarbon radicals are described in U.S. Pat. No. 3,419,593, which issued to David N. Willing on Dec. 31, 1968, incorporated by reference.

The concentration of hydrosilation catalyst in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

The Platinum Catalyst Inhibitor

Mixtures of the aforementioned polyolefin, adhesion promoter, organohydrogenpolysiloxane and hydrosilation catalyst may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will, in some instances, impart satisfactory storage stability and cure rate. In other instances inhibitor concentrations of up to 500 or more moles of inhibitor per mole of platinum are required. The type and concentration of inhibitor that will provide excellent adhesion in a given composition can readily be determined by routine experimentation and does not constitute part of this invention. It has been noted by the present inventors that certain types of catalyst inhibitors may adversely affect the degree of adhesion that is developed under a given set of curing conditions compared to compositions containing a different type of inhibitor.

Alternative Curable Polyolefin Compositions

In place of the ethylenically unsaturated hydrocarbon radicals present on the polyolefin and the organohydrogenpolysiloxane curing agent referred to in the preceding section of this specification, other types of functional groups that can be present include; but are not limited to,:

1) a first class of functional groups that react with one another in the presence of moisture;
2) a second class of functional groups that react with one another in the presence of free radicals generated by organic peroxides and photodecomposable compounds;
3) a third class of functional groups that react with a fourth class of functional groups present in a curing agent that is part of said composition; and
4) a fifth class of functional groups that react with a sixth class of functional groups present in a curing agent in the presence of a curing catalyst, where said curing agent and curing catalyst are part of said composition.

Optional Ingredients of the Polyolefin Composition

The present polyolefin compositions can contain one or more additives that are conventionally present in compositions of this type to impart or enhance certain physical properties of the cured polymer in addition to adhesion or to facilitate processing of the composition.

Typical additives include but are not limited to reinforcing fillers such as finely divided silica; non-reinforcing fillers such as quartz, alumina, mica and calcium carbonate; pigments such as carbon black and titanium dioxide; dyes, flame retardants, and heat and/or ultraviolet light stabilizers.

Preparation of Curable Compositions

The compositions of this invention can be prepared by combining all of the ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers, single screw or twin screw or twin screw extruders and two- and three-roll rubber mills.

Cooling of the ingredients during mixing may be desirable to avoid premature curing of the composition.

To maximize storage stability of preferred curable polyolefin compositions that cure by a hydrosilation reaction, these compositions are preferably kept in closed containers until used. If greater storage stability is desired, the compositions can be packaged in two or more containers with the organohydrogensiloxane and the platinum group metal catalyst in separate containers.

Cured materials prepared using the present compositions can vary in properties from brittle resins to elastomers to gels, and are useful in a variety of end-use applications such as coatings or as molded or extruded articles. Unfilled materials are particularly useful as gels and coatings for protecting delicate electronic devices, such as integrated circuits, from damage by moisture and other materials present in the environment that can adversely affect operation of the device. The compositions can be used to coat either the individual devices or a circuit board containing a number of these devices together with other electronic components.

Compositions containing reinforcing and/or non-reinforcing fillers are useful as adhesives, encapsulants and potting materials.

The present compositions can be applied to substrates by spraying, dipping, pouring, extrusion or by the use of a brush, roller or coating bar. The selection of a particular application method will be determined at least in part by the viscosity of the curable composition. The viscosity of the composition can be reduced using suitable plasticizers or solvents, as known in the art.

EXAMPLES

The following examples describe preferred curable compositions of the present invention and should not be interpreted as limiting the scope of the invention defined in the accompanying claims. Unless otherwise specified, all parts and percentages in the examples are by weight and viscosities were measured at 25° C.

The following procedure was used to prepare the reaction products of polyhydric alcohols with alkoxysilanes: A three-necked, round bottom glass reactor was charged with 84.3 parts of tetraethyl orthosilicate as ingredient B2 and 0.1 part of tetrabutyl titanate. The reactor was then equipped with a magnetic stirrer, thermometer, addition funnel, distillation head, condenser, receiver flask cooled with dry ice, dry ice-cooled finger trap, and a tube for introducing nitrogen into the reactor. All the glassware was dried at 120° C. prior to use. 15.7 parts of ethylene glycol as ingredient BI and 15.7 parts of ethyl alcohol were placed in the addition funnel.

The reactor was then flushed using dry nitrogen and the contents were stirred and heated to about 90° C., at which time the polyhydric alcohol solution was added slowly over 55 minutes. A flow of nitrogen was maintained throughout the reaction. The initially yellow mixture in the reaction vessel became clear upon addition of the ethylene glycol/ethyl alcohol mixture. The flow of nitrogen was discontinued 20 minutes following completion of the addition, at which time vacuum was applied within the reactor and the pressure within the reactor gradually reduced to 50 mm of mercury over 14 minutes and was maintained at this level with heating for 20 minutes. The resultant reaction mixture was allowed to cool to ambient temperature and brought to atmospheric pressure.

The reactor contained 69.3 g of a transparent yellow fluid, referred to hereinafter as the adhesion promoter (AP).

Example 1

Curable polyisobutylene formulations were prepared by blending 1) 76.9 parts of a telechelic allyl-functional polyisobutylene (Epion™ 200A; Kanegafuchi Chemical Industry Co., Ltd; Japan) exhibiting a molecular weight of 5000; 2) 23.1 parts of an organic plasticizer, a long-chain hydrocarbon oil available from Apollo America Corporation as KP-32; and 15 ppm of platinum as a 0.1 percent by weight solution in a liquid hydrogenated polybutene of a complex formed from platinum dichloride and tetramethyldivinyldisiloxane. The complex contained 21 weight percent platinum and the liquid hydrogenated polybutene is available as Panalane™ L-14E (number average molecular weight=363) from the Amoco Corporation.

To the resultant mixture was added one of two different organohydrogensiloxanes in an amount sufficient to provide a molar ratio of silicon bonded hydrogen atoms to allyl radicals in the polyolefin of 2:1. The organohydrogensiloxanes used were $Me_3SiO(Me_2SiO)_3(MeHSiO)_5SiMe_3$ (Crosslinker I) and $Me_3SiO(Me_2SiO)_5(MeHSiO)_{10}$ $(MeC_{16}H_{33}SiO)_3SiMe_3$ (Crosslinker II). A mixture containing a 1:1 weight ratio of crosslinkers I and II was also used.

The platinum catalyst inhibitors used were 1) cyclic methylvinylsiloxanes (MVC) at a molar ratio of inhibitor to platinum of 57:1 or 1 14:1 or 2) methylbutynol (MB) at molar ratio of inhibitor to platinum of 60:1.

Portions of each of the polyolefin compositions were blended with the adhesion promoter (AP) and then evaluated by applying them as 10 mil (0.25 mm)-thick liquid films to the desired substrate using a draw-down bar. The coatings were cured by heating the coated substrates for 90 minutes at 120° C. in a forced air oven and allowed to age for 7 days under ambient conditions before the adhesion of the coating was evaluated.

The substrates used were glass, milled aluminum, bare aluminum, and stainless steel (SS).

The adhesion test consisted of scratching the cured coatings with the blade of a metal spatula to determine whether the coating could be removed without leaving a residue on the surface. The coating was rated 0 if it could be removed without leaving residue on surface.

If some residue remained, it was rubbed using a fingertip to determine the pressure required to remove the residue and rated according to the following scale.

1=light pressure
2=moderate pressure
3=heavy pressure
4=no coating could be removed The amount of adhesion promoter (AP), type and amount of catalyst inhibitor (Inhib.) and type of crosslinker(s) (XL) present in the ten compositions evaluated are summarized in Table 1.

TABLE 1

| Comp. No. | AP % | Inhib. Type/Pt:inhib. molar ratio | XL |
|---|---|---|---|
| 1(c) | None | MVC/57 | I |
| 2(c) | None | MVC/57 | II |
| 3 | 1.5 | MVC/114 | I |
| 4 | 2.5 | MVC/57 | I |
| 5 | 2.5 | MVC/114 | I |
| 6 | 2.5 | MB/60 | I/II |
| 7 | 2.5 | MVC/114 | I/II |
| 8 | 5.0 | MVC/57 | I |
| 9 | 5.0 | MVC/114 | I |
| 10 | 5.0 | MB/60 | I | c = control for comparative purposes

The adhesion ratings for the compositions are summarized in Table 2.

TABLE 2

| Comp. No. | Glass | Milled Al | Bare Al | SS |
|---|---|---|---|---|
| 1(c) | 0 | 0 | 3 | 0 |
| 2(c) | 0 | 0 | 0 | 0 |
| 3 | 0 | 4 | 1 | 1 |
| 4 | 3 | 4 | 4 | 4 |
| 5 | 4 | 1 | 1 | 4 |
| 6 | 0 | 0 | 3 | 4 |
| 7 | 0 | 2 | 3 | 4 |
| 8 | 4 | 3 | 4 | 4 |
| 9 | 0 | 1 | 1 | 2 |
| 10 | 0 | 4 | 4 | 1 |

Example 2

This example describes the preparation and performance of adhesion promoters prepared by reacting ethylene glycol as ingredient B1 with a) tetraethyl orthosilicate, $(C_2H_5O)_4Si$, an embodiment of ingredient B2, and optional organosilicon compounds referred to hereinbefore as ingredient B4.

A reaction product referred to hereinafter as adhesion promoter 2 was prepared by weighing 41.47 g allyltriethoxysilane(ingredient B4), 42.27 g tetraethyl orthosilicate(ingredientB2), and 0.10 g tetrabutyltitanate into a three-necked, round bottom flask. The flask was then equipped as described in Example 1. Into the addition funnel had been weighed 16.26 g ethylene glycol as ingredient B1, 16.26 g ethyl alcohol and these ingredients mixed. The reaction mixture was then stirred, heated to about 90° C., and the ethylene glycol/ethyl alcohol solution added slowly over about 50 minutes. The initially yellow mixture in the reaction flask became almost clear and colorless upon addition of the ethylene glycol/ethyl alcohol solution.

Heating of the reaction mixture at 90° C. was continued for an additional 20 minutes, at which time the nitrogen purge was stopped and vacuum applied. The pressure was reduced to about 50 mm Hg over 5 minutes and maintained at that pressure for 15 minutes. The reaction mixture was then cooled, which caused it to become cloudy. The contents of the reactor were brought to atmospheric pressure, pressure filtered through Whatmans # 1 filter paper was recovered as a clear liquid (adhesion promoter 2).

An adhesion promoter was prepared by placing 61.42 parts of tetraethyl orthosilicate and 0.10 parts of tetrabutyltitanate into a dry glass reactor equipped with an addition funnel, distillation head, condenser, receiver vessel cooled with dry ice, and a nitrogen purge.

Into the addition funnel were placed 5.72 parts ethylene glycol and 32.86 parts of a hydroxyl-tenninatedpolymethylvinylsiloxanehaving a hydroxyl content of 10.1 wt % and a vinyl content of 10.1 wt % (ingredientB4).

The contents of the reactor were heated to about 90° C. with stirring under a current of nitrogen, at which time the contents of the addition funnel were added slowly over about 40 minutes. Heating and stirring of the reaction mixture were continued for an additional 23 minutes following completion of the addition, at which time the flow of nitrogen through the reactor was discontinued and vacuum was applied to the reactor. The pressure was reduced to about 50 mm Hg in 10 minutes and maintained at that pressure for 1 0 29 minutes. The reaction mixture was then cooled and brought to atmospheric pressure. 75.1 g of a transparent, deep yellow fluid product were recovered from the reactor (adhesion promoter 3).

A reaction product referred to hereinafter as adhesion promoter 4 was prepared by charging a glass reactor equipped as described in Example 1 with 29.49 parts of tetraethyl orthosilicate, 33.46 parts of 3-glycidoxypropyltrimethoxysilane (ingredient B4), and 0.10 parts of tetrabutyl titanate. Into the addition funnel were placed 5.49 parts ethylene glycol and, as ingredient B4, 31.56 parts of a hydroxyl terminated polymethylvinylsiloxane having a hydroxyl content of 10.1 wt % and a vinyl content of 10.1 wt %.

The mixture in the reactor was stirred and heated to about 90° C. under a current of nitrogen, at which time the contents of the addition funnel were added gradually over about 44 minutes. Heating and stirring were continued for an additional 20 minutes following completion of the addition, at which time the flow of nitrogen was discontinued and vacuum applied to the reactor. The pressure was reduced to about 50 mm Hg in 6 minutes and maintained at that pressure for 23 minutes.

The contents of the reactor were then cooled, brought to atmospheric pressure, yielding 82.52 g of a translucent, yellow-tan liquid (adhesion promoter 4).

Curable polyisobutylenecompositions containing adhesion promoter 2, or 4 were prepared by blending 100 parts of an allyl-functional polyisobutyleneexhibiting a molecular weight of 10,000 (Epion™ EP400A) with 100part of Panalane™ L-14 E and 150 pars of calcium carbonate filler consisting essentially of a 2:1 mixture of Winnofil™ SPM and Georgia Marble CS-11. The resultant polymer mixture was then blended with crosslinker I described in example 1, adhesion promoter 2, 3 or 4 and 0.1 weight percent of tetrabutyl titanate as an adhesion catalyst. After being blended to homogeneity the composition was combined with a hydrosilation catalyst mixture. This catalyst mixture was a 0.4 weight percent solution in a liquid hydrogenated polybutene (number average molecular weight=363) of a complex formed from platinum dichloride and tetramethyldivinyldisiloxane.The complex contained 21 weight percent platinum.

The percentages of polyisobutylene, adhesion promoter, catalyst mixture, and crosslinker are summarized in Table 3.

TABLE 3

| Composition | Adhesion Promoter No. | Adhesion Promoter % | Polymer Mixture % | Catalyst Mixture % | Crosslinker % |
|---|---|---|---|---|---|
| 11 | 2 | 2.5 | 91.512 | 5.099 | 0.654 |
| 12 | 3 | 1.5 | 92.451 | 5.152 | 0.660 |
| 13 | 4 | 2.5 | 91.512 | 5.099 | 0.654 |

Compositions 11, 12 and 13 were applied to glass, bare aluminum, stainless steel and an epoxy-fiberglass composite (FR-4 boards) as described in Example 1. The coatings were cured by heating the coated substrates for 90 minutes at 120° C. The adhesion of the coated samples was evaluated following cooling and following additional aging under ambient conditions for 24 hours, 3 days and 7 days. The adhesion of the coating was evaluated using the procedure described in Example 1. The results of the evaluations are summarized in Table 4.

TABLE 4

| Substrate/Aging Time Following Heating @ 120° C. | Composition 11 | Composition 12 | Composition 13 |
|---|---|---|---|
| Glass | | | |
| None | 4 | 4 | 1 |
| 24 Hours | 4 | 4 | 1 |
| 3 Days | 4 | 4 | 3 |
| 7 Days | 4 | 4 | 4 |
| Aluminum | | | |
| None | 4 | 0 | 0 |
| 24 Hours | 4 | 0 | 4 |
| 3 Days | 4 | 0 | 4 |
| 7 Days | 4 | 0 | 4 |
| FR-4 | | | |
| None | 4 | 4 | 0 |
| 24 Hours | 4 | 4 | 0 |
| 3 Days | 4 | 4 | 0 |
| 7 Days | 4 | 4 | 0 |
| Stainless Steel | | | |
| None | 4 | 4 | 1 |
| 24 Hours | 4 | 4 | 4 |
| 3 Days | 4 | 4 | 4 |
| 7 Days | 4 | 4 | 4 |

Comparison of the data in Table 4 with the adhesion data in the foregoing Table 2 demonstrate the improved adhesion to glass achieved using one of the optional silanes referred to as ingredient B4 of the present compositions. The addition of allyltriethoxysilane as ingredient B4 also improved the adhesion to aluminum.

Example 3

This example demonstrates the effect on adhesion of varying the concentrations of the adhesion promoter and curing catalyst inhibitor in a filled polyisobutylene composition.

Curable filled polyisobutylene formulations were prepared by blending 100 parts of the allyl-flnctional polyisobutylene exhibiting a molecular weight of 10,000 with 100 parts of Panalane L-14E and 150 parts of calcium carbonate consisting essentially of a 2:1 mixture of Winnofil$^R$ SPM and Georgia Marble CS. To 18.2 parts of this composition were added 1.0 part of the catalyst mixture described in Example 2, 0.25 part of Crosslinker I and 0.02 part of tetrabutyltitanate.

Portions of the resultant composition were blended with the adhesion promoter described in Example 1 of this specification (AP) and methylvinyl cyclics catalyst inhibitor to form compositions 14–18. The amounts of these additional ingredients are summarized in Table 5.

TABLE 5

| Composition No. | AP amount | Inhib. Amount |
|---|---|---|
| 14 | 0.5 g | 30 μl |
| 15 | 0.5 g | 20 μl |
| 16 | 0.5 g | 10 μl |
| 17 | 1.0 g | 30 μl |
| 18 | 1.0 g | 0 μl |

The compositions were applied to the substrates listed in Table 4. The coatings were cured and rated as described in the preceding Example 1. The adhesion ratings for the compositions are summarized in Table 6.

TABLE 6

| Composition No. | Glass | Milled Al | Bare Al | Stainless Steel |
|---|---|---|---|---|
| 14 | 1 | 4 | 1 | 4 |
| 15 | 4 | 4 | 4 | 4 |
| 16 | 4 | 4 | 4 | 4 |
| 17 | 3 | 4 | 4 | 4 |
| 18 | 4 | 4 | 4 | 4 |

That which is claimed is:

1. A polyolefin composition exhibiting adhesion to inorganic and organic substrates when cured thereon, said composition comprising
   A. at least one polyolefin containing repeating units derived from at least one olefin and functional groups capable of reacting to crosslink said polyolefin; and
   B. an effective amount of an adhesion promoter for said polyolefin; wherein said adhesion promoter is a reaction product of (B1) a polyhydric alcohol of the general formula $R^1(OH)_m$; and (B2) at least one organosilicon compound selected from the group consisting of silanes of the general formula $R^2{}_nSiX_{(4-n)}$ and bis-silylalkanes of the formula $X_3SiR^3SiX_3$, wherein said reaction product contains at least two silicon atoms per molecule; $R^1$ represents a hydrocarbon radical or an alkoxy-substituted hydrocarbon radical, wherein $R^1$ is substantially free of ethylenic unsaturation and exhibits a valence of m; m represents an integer with a value of at least 2; $R^2$ is selected from the group consisting of unsubstituted hydrocarbon radicals and hydrocarbon radicals containing at least one substituent selected from the group consisting of $CH_2$=CH—, acryloxy, methacryloxy, epoxy, carboxy, amino, amido, acrylamido, methacrylamido,

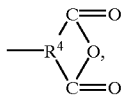

and mercapto;
   $R^3$ is alkylene, $R^4$ is a trivalent hydrocarbon radical, X represents a hydrolyzable group and n is 0 or 1; and wherein said organosilicon B2 compound constitutes from 10 to 90 percent of the combined weight of B1 and B2.

2. A composition according to claim 1 wherein $R^1$ is an alkylene radical containing from 2 to 10 carbon atoms, $R^2$ contains from 1 to 10 carbon atoms; X is alkoxy containing from 1 to 20 carbon atoms; m is 2, 3 or 4 and said adhesion promoter is flowable at a temperature of from 25 to 35° C.

3. A composition according to claim 1 wherein said organosilicon compound B2 constitutes from 30 to 70 weight percent, based on the combined weights of said organosilicon compound and said polyhydric alcohol.

4. A composition according to claim 2 wherein said polyhydric alcohol B1 is selected from the group consisting of ethylene glycol, propylene glycol, 1,3-propanediol, glycerol, 1,4-butanediol, neopentyl glycol, 2,2,2-trimethylolpropane and 1,10-decanediol; X is alkoxy containing from 1 to 20 carbon atoms; and $R^2$ is an alkyl radical.

5. A composition according to claim 2 wherein $R^2$ is alkyl and contains from 1 to 4 carbon atoms.

6. A composition according to claim 5 wherein said organosilicon compound B2 is selected from the group consisting of methyltrimethoxysilane, methyltriethoxysilane, allyltrimethoxysilane, tetramethyl orthosilicate, tetraethyl orthosilicate and methyltriisopropenyloxysilane.

7. A composition according to claim 1 where said adhesion promoter constitutes from 1 to 10 percent by weight of said polyolefin composition.

8. A composition according to claim 1 wherein the ingredients of said adhesion promoter additionally comprise from 0.5 to 2 moles per mole of said polyhydric alcohol B1, of a mono- or polyhydric alcohol B3 of the formula $R^6(OH)p$ where $R^6$ represents a hydrocarbon radical exhibiting a valence of p and containing at least one organofunctional substituent selected from the group consisting of $CH_2=CH-$, acryloxy, methacryloxy, epoxy, carboxy, amino, amido, acrylamido, methacrylamido,

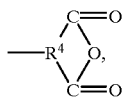

and mercapto; $R^4$ is a trivalent hydro-carbon radical and p is an integer with a value of at least 1.

9. A composition according to claim 1 wherein the ingredients of said adhesion promoter additionally comprise an organosilicon compound B4 selected from the group consisting of organosilanes of the formula $R^7_q R^8_r SiY_{4-q-r}$ and organopolysiloxanes having the average unit formula $R^7_q R^8_r Y_s SiO_{(4-q-r-s)/2}$, wherein $R^7$ represents an unsubstituted monovalent hydrocarbon radical; $R^8$ represents a monovalent hydrocarbon radical containing an organofunctional substituent selected from the group consisting of $CH_2=CH-$, acryloxy, methacryloxy, epoxy, carboxy, amino, amido, acrylamido, methacrylamido, and mercapto; Y represents a hydroxyl group or a group that is hydrolyzed to a hydroxyl group in the presence of water; the average value of q is from 0 to 3, inclusive; the average values of r and s are greater than 0 and no greater than 3; the sum of q and r in the formula of said organosilanes does not exceed 3; the sum of q, r and s does not exceed 3; and wherein said compound B4 constitutes from 40 to 70 weight percent of all organosilicon compounds present in said ingredients.

10. A composition according to claim 9 wherein $R^7$ contains from 1 to 5 carbon atoms and the hydrocarbon portion of $R^8$ is selected from the group consisting of alkylene, cycloalkylene and arylene.

11. A composition according to claim 1 further comprising at least one organosilicon compound B5 selected from the group consisting of organosilanes and organopolysiloxanes containing (a) at least one of a first reactive group selected from the group consisting of silanol and hydrolyzable groups and (b) at least one of a second reactive group selected from $CH_2=CH-$, acryloxy, methacryloxy, epoxy, carboxy, amino, amido, acrylamido, methacrylamido, rand mercapto.

12. A composition according to claim 11 wherein said organosilicon compound B5 is selected from the group consisting of organosilanes exhibiting the formula $R^9_t R^{10}_u SiO_{(4-t-u)/2}$ and organopolysiloxanes comprising repeating units of the formula $(OZ)_v R^{10}_u SiO_{(4-u-v)/2}$, wherein $R^9$ represents hydrogen or an ethylenically unsaturated group capable of undergoing a hydrosilation reaction; $R^{10}$ represents an unsubstituted or substituted alkyl radical containing from 1 to 4 carbon atoms; t and v are 1, 2 or 3; u is 0, 1, 2 or 3; the sum of t+u and u+v do not exceed 3; OZ is selected from the group consisting of hydroxyl, alkoxy containing from 1 to 4 carbon atoms and isoalkenyloxy, with the proviso that v is 1 when Z is H.

13. A composition according to claim 1 wherein said polyolefin comprises (a) repeating units derived from at least one olefin and (b) at least two functional groups per molecule selected from the group consisting of 1) a first class of functional groups that react with one another in the presence of moisture;

2) a second class of functional groups that react with one another in the presence of free radicals generated by organic peroxides and photodecomposable compounds;

3) a third class of functional groups that react with a fourth class of functional groups present in a curing agent that is part of said composition; and 4) a fifth class of functional groups that react with a sixth class of functional groups present in a curing agent in the presence of a curing catalyst, where said curing agent and curing catalyst are part of said composition.

14. A composition according to claim 13 wherein said repeating units contain from 2 to 6 carbon atoms.

15. A composition according to claim 14 wherein the repeating units are isobutylene.

16. A composition according to claim 15 wherein the reaction used to cure said polyolefin is selected from the group consisting of 1) platinum-catalyzed reactions of silicon-bonded hydrogen atoms with alkenyl radicals or silanol groups present on the polyolefin;

2) reaction of silicon-bonded hydrolyzable groups in the presence of atmospheric moisture;

3) reaction of silicon-bonded hydrolyzable groups with silanol groups in the presence of a suitable catalyst;

4) reaction of mercapto groups with one another in the presence of oxygen and a chelated organometallic compound;

5) reaction of epoxy groups with acid anhydride or amine groups in the presence of a suitable catalyst;

6) reaction of mercapto groups with alkenyl radicals in the presence of a metal carboxylate of a chelated organometallic compound;

7) reactions involving groups present on the polyolefin with either free radicals or cations formed by irradiation of photosensitive compounds with ultraviolet light and 8) reactions involving groups present on the polyolefin that are initiated by high energy particles.

17. A composition according to claim 16 wherein said reaction is selected from the group consisting of 1) reaction of alkenyl groups present on the polyolefin with an organohydrogensiloxane using platinum or a platinum compound as the catalyst;

2) reaction of silanol groups on the polyolefin with silicon-bonded hydrogen atoms on a curing agent in the presence of a catalyst selected from tin compounds, amines, or platinum compounds; and;

3) free radical reactions involving polymerization of ethylenically unsaturated groups present on the polyolefin, wherein the free radicals are generated by irradiation of a photosensitive compound.

18. A composition according to claim 17 wherein the functional groups present on the polyolefin are ethylenically unsaturated hydrocarbon radicals containing from two to six carbon atoms, said composition further containing an organohydrogensiloxane and a hydrosilation catalyst, wherein ingredient B1 is ethylene glycol and ingredient B2 is tetraethyl orthosilicate.

19. A composition according to claim 9 wherein said polyolefin is a polyisobutylene and said adhesion promoter is a reaction product of ethylene glycol, tetraethyl orthosilicate, and an organosilicon compound (B4) selected from the group consisting of allyltriethoxysilane and 3-glycidoxypropyltrimethoxysilane.

20. A composition according to claim 15 wherein said adhesion promoter is a reaction product of ethylene glycol, tetraethyl orthosilicate and a hydroxy-terminated polymethylvinylsiloxane (B4).

* * * * *